United States Patent
Sugino

(10) Patent No.: US 8,619,293 B2
(45) Date of Patent: Dec. 31, 2013

(54) IMAGE FORMING APPARATUS, IMAGE FORMATION SUPPORTING SYSTEM, AND IMAGE FORMATION SUPPORTING METHOD WHICH COMMUNICATES WITH A HANDHELD DEVICE

(75) Inventor: Makoto Sugino, Kanagawa (JP)

(73) Assignee: Ricoh Company, Limited, Tokyo (JP)

( * ) Notice: Subject to any disclaimer, the term of this patent is extended or adjusted under 35 U.S.C. 154(b) by 559 days.

(21) Appl. No.: 12/878,616

(22) Filed: Sep. 9, 2010

(65) Prior Publication Data

US 2011/0063645 A1    Mar. 17, 2011

(30) Foreign Application Priority Data

Sep. 15, 2009  (JP) ................................. 2009-213424
Jul. 26, 2010  (JP) ................................. 2010-167494

(51) Int. Cl.
*G06F 3/12* (2006.01)
*G06K 15/00* (2006.01)

(52) U.S. Cl.
USPC ....................... 358/1.15; 358/1.13; 348/207.2

(58) Field of Classification Search
USPC ............................... 358/1.15, 1.13; 348/207.2
See application file for complete search history.

(56) References Cited

U.S. PATENT DOCUMENTS

| | | | |
|---|---|---|---|
| 6,739,771 B2* | 5/2004 | Kawaoka | 400/61 |
| 2004/0190049 A1* | 9/2004 | Itoh | 358/1.15 |
| 2006/0139687 A1 | 6/2006 | Ohara et al. | |
| 2007/0086051 A1* | 4/2007 | Kunori | 358/1.15 |
| 2007/0146474 A1* | 6/2007 | Kameda et al. | 347/262 |
| 2008/0022087 A1 | 1/2008 | Tsujimoto | |
| 2009/0193181 A1 | 7/2009 | Sugino | |

FOREIGN PATENT DOCUMENTS

| | | |
|---|---|---|
| CN | 1541370 A | 10/2004 |
| CN | 101004670 A | 7/2007 |
| CN | 101072281 A | 11/2007 |
| JP | 2005-114790 | 4/2005 |
| JP | 2006-191200 A | 7/2006 |
| JP | 2007-274275 | 10/2007 |
| JP | 2008-200898 | 9/2008 |
| WO | WO 02/084928 A2 | 10/2002 |

OTHER PUBLICATIONS

Combined Chinese Office Action and Search Report issued Dec. 13, 2012 in Chinese Patent Application No. 201010511655.7 (with English-language translation).
Office Action dated Jul. 9, 2013, issued in Chinese Patent Application No. 201010511655.7 (with English translation).
Search Report dated Jul. 9, 2013, issued in Chinese Application No. 201010511655.7 (with English translation).

* cited by examiner

*Primary Examiner* — Fred Guillermety
(74) *Attorney, Agent, or Firm* — Oblon, Spivak, McClelland, Maier & Neustadt, L.L.P.

(57) ABSTRACT

When an initial communication program is started, a handheld device searches for image forming apparatuses within its communicable range. Then, upon receiving a response of that inquiry from an image forming apparatus, the handheld device requests the image forming apparatus for an image-forming-apparatus control program for handheld devices according to a predetermined determination condition. The image forming apparatus then responds to the inquiry from the handheld device and sends to the handheld device the image-forming-apparatus control program for handheld devices that has been stored in a memory device. Upon receiving the image-forming-apparatus control program for handheld devices, the handheld device stores it in a memory unit, terminates the execution of the initial communication program, and executes the image-forming-apparatus control program for handheld devices.

3 Claims, 15 Drawing Sheets

FIG. 1
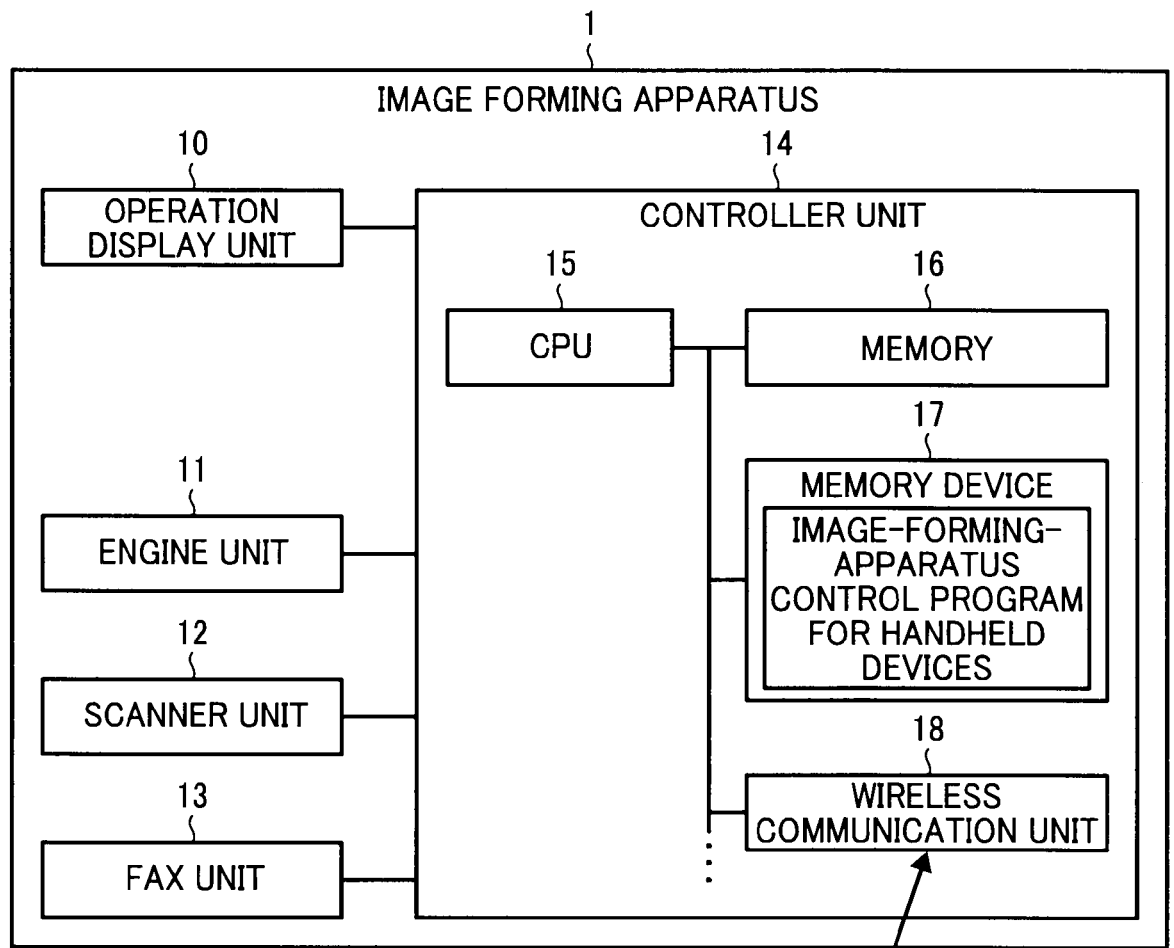
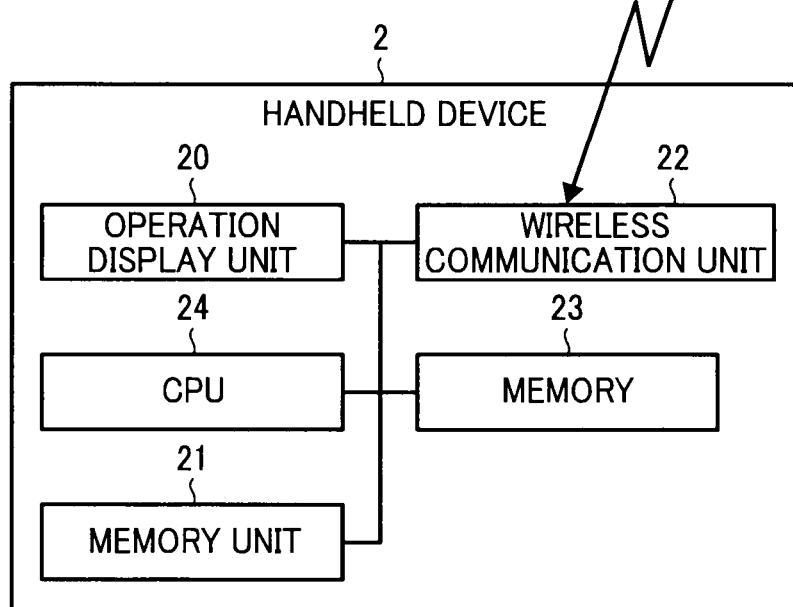

FIG. 9

NAME=2in1 2 SIDED COPY
FUNCTION=COPY
SCAN_SIDE=ONE
Nin1=2
PAPER_SIZE=A4
PRINT_SIDE=BOTH

FIG. 10

[SETTING 1]
NAME=2in1 2 SIDED COPY
FUNCTION=COPY
SCAN_SIDE=ONE
Nin1=2
PAPER_SIZE=A4
PRINT_SIDE=BOTH

[SETTING 2]
NAME=2in1 COPY
FUNCTION=COPY
SCAN_SIDE=BOTH
Nin1=2
PAPER_SIZE=A4
PRINT_SIDE=ONE

IMAGE FORMING APPARATUS, IMAGE FORMATION SUPPORTING SYSTEM, AND IMAGE FORMATION SUPPORTING METHOD WHICH COMMUNICATES WITH A HANDHELD DEVICE

CROSS-REFERENCE TO RELATED APPLICATIONS

The present application claims priority to and incorporates by reference the entire contents of Japanese Patent Application No. 2009-213424 filed in Japan on Sep. 15, 2009 and Japanese Patent Application No. 2010-167494 filed in Japan on Jul. 26, 2010.

BACKGROUND OF THE INVENTION

1. Field of the Invention

The present invention relates to an image forming apparatus, an image formation supporting system, and an image formation supporting method.

2. Description of the Related Art

In recent years, image forming apparatuses such as facsimile apparatuses, printers, copying machines, and multi-function products (MPFs) are being configured to have more and more functions. That phenomenon has led to an increase in not only the number of operation buttons that are provided in an operating unit for the purpose of allowing a user to input various operations but also in the number of operation items that can be input. Consequently, it is becoming more and more difficult to figure out at first glance the necessary operations to perform in order to implement an intended function. Meanwhile, these days, handheld devices such as cellular phones or handheld gaming gadgets that are easy to carry at all times have a high penetration rate and it is not uncommon for a person to possess more than one handheld device. With regards to such handheld devices, there has been a remarkable development in multi-functionality and sophistication, so much so that the functions that were earlier performed on personal computers (PCs) can now be performed on handheld devices. For example, handheld devices have been put to use for authenticating the users of image forming apparatuses.

In the past, a technology has been disclosed in which a handheld device is put to use as a personal authentication device at the time of using an image forming apparatus and, after the authentication is performed, the image forming apparatus displays on an operating unit thereof a screen that is customized on an individual basis (e.g., see Japanese Patent Application Laid-open No. 2005-114790). Moreover, a technology has been disclosed in which a handheld device is put to use as a personal authentication device at the time of using an image forming apparatus and the image forming apparatus is configured in such a way that, after the authentication is performed, the user is freed from the requirement of inputting the user information point-by-point in the image forming apparatus (e.g., see Japanese Patent Application Laid-open No. 2008-200898). Furthermore, a handheld device has been disclosed that allows customization of the display screen according to the preferences of the user in order to enhance the operability (e.g., see Japanese Patent Application Laid-open No. 2007-274275).

However, in the case of conventional image forming apparatuses and conventional handheld devices as described above, although an image forming apparatus can be authenticated using a handheld device, it is still necessary to directly operate the operating unit of the image forming apparatus in order to implement various functions such as copying, printing, and facsimile communication or to perform operations regarding various settings for implementing those functions. Thus, it is not that simple to perform the operations related to the image forming apparatus.

Meanwhile, there have been strong demands from companies for products having information security measures in order to prevent leakage of information. In spite of that, during the on-site use of image forming apparatuses, there are times when the personal authentication settings for the users are determined to be unnecessary. Thus, it is highly conceivable that, at best, password settings are provided for the administrators of image forming apparatuses. Thus, it is not uncommon that any ordinary user is able to implement almost all functions of an image forming apparatus just by standing in front of it. Because of such practices, even if an image forming apparatus is equipped with a function for customizing the screen on a user-by-user basis, it is difficult for a user to customize the screen to one's own preferences. Meanwhile, although some image forming apparatuses are equipped with a web-based function of setting a customization option for customizing screens on an individual basis, the lack of user administration makes it difficult to implement that function.

Moreover, it is standard practice for companies to install a plurality of image forming apparatuses each having different functions and capability. For example, generally, there are installed medium-speed image forming apparatuses capable of forming color images and high-speed image forming apparatuses capable of forming monochromatic images. Thus, the users can make use of such image forming apparatuses according to the features. In an environment in which a plurality of image forming apparatuses is installed, the manner in which each image forming apparatus is used is mostly decided. In such an environment, since the method of performing settings for an intended function is different in each image forming apparatus, standardization has been a difficult task and it has become a common sight to find users getting stuck in front of image forming apparatuses.

The present invention has been made to solve the above problems in the conventional technology and it is an object of the present invention to provide an image forming apparatus, an image formation supporting system, and an image formation supporting method so that, even with respect to a plurality of image forming apparatuses each having different functions and capability, simple operations can be performed from a handheld device depending on the intended use of each image forming apparatus.

SUMMARY OF THE INVENTION

It is an object of the present invention to at least partially solve the problems in the conventional technology.

According to an aspect of the present invention, there is provided an image forming apparatus having at least one of an image reading function, a copying function, a printing function, and a facsimile communication function and being capable of implementing a function related to image formation, the image forming apparatus comprising: a memory unit for storing a program that is executed in a handheld device for the purpose of displaying on the handheld device a first screen for setting an advanced setting item as an image forming condition at the time of performing image formation by implementing the function and for the purpose of displaying on the handheld device a second screen for requesting image formation; a sending unit for sending to the handheld device the program stored in the memory unit in response to a request from the handheld device; and an image forming unit for performing, when the handheld device sends an image forming request that has an image forming condition specified therein and that requests for image formation by implementation of the function, image formation according to the image forming condition specified in the image forming request.

According to another aspect of the present invention, there is provided an image formation supporting system comprising: an image forming apparatus having at least one of an image reading function, a copying function, a printing function, and a facsimile communication function and being capable of implementing a function related to image formation; and a handheld device performing communication with the image forming apparatus, wherein the image forming apparatus includes a first memory unit for storing a program that is executed in a handheld device for the purpose of displaying on the handheld device a first screen for setting an advanced setting item as an image forming condition at the time of performing image formation by implementing the function and for the purpose of displaying on the handheld device a second screen for requesting image formation; a sending unit for sending to the handheld device the program stored in the first memory unit in response to a request from the handheld device; and an image forming unit for performing, when the handheld device sends an image forming request that has an image forming condition specified therein and that requests for image formation by implementation of the function, image formation according to the image forming condition specified in the image forming request, the handheld device includes an input receiving unit for receiving an operation input from a user; a program requesting unit for requesting in response to the operation input received by the input receiving unit and according to a predetermined determination condition, the image forming apparatus for the program; a receiving unit for receiving the program from the image forming apparatus; a second memory unit for storing the program received by the receiving unit; and an executing unit for executing the program, the executing unit including a first display control unit for displaying the first screen on a display unit by executing the program; a memory control unit for setting, in response to an operation input received with respect to the first screen by the input receiving unit, the advanced setting item and storing a configuration file that indicates setting of the advanced setting item in the second memory unit in a corresponding manner with the image forming apparatus; a second display control unit for displaying the second screen on the display unit by making use of the configuration file; and a request sending unit for sending, according to an operation input received with respect to the second screen by the input receiving unit, an image forming request, in which is specified the setting of the advanced setting item indicated in the configuration file, as an image forming condition to the image forming apparatus.

According to still another aspect of the present invention, there is provided an image formation supporting method implemented in an image formation supporting system that includes an image forming apparatus having at least one of an image reading function, a copying function, a printing function, and a facsimile communication function and being capable of implementing a function related to image formation, the image forming apparatus including a first memory unit for storing a program that is executed in a handheld device for the purpose of displaying on the handheld device a first screen for setting an advanced setting item as an image forming condition at the time of performing image formation by implementing the function and for the purpose of displaying on the handheld device a second screen for requesting image formation; a sending unit; and an image forming unit; and a handheld device performing communication with the image forming apparatus, the handheld device including an input receiving unit; a program requesting unit; a receiving unit; a memory control unit; and an executing unit, the image formation supporting method comprising: sending, by the sending unit, to the handheld device the program stored in the first memory unit in response to a request from the handheld device; image-forming, by the image forming unit, that includes performing, when the handheld device sends an image forming request that has an image forming condition specified therein and that requests for image formation by implementation of the function, image formation according to the image forming condition specified in the image forming request; input-receiving, by the input receiving unit, that includes receiving an operation input from a user; requesting, by the program requesting unit, the image forming apparatus for the program in response to the operation input received by the input receiving unit and according to a predetermined determination condition; receiving, by the receiving unit, the program from the image forming apparatus; first-memory-controlling, by the memory control unit, that includes storing the program received at the receiving in a second memory unit; and executing, by the executing unit, the program, the executing including first-display-controlling that includes displaying the first screen on a display unit by executing the program; second-memory-controlling that includes setting, in response to an operation input received with respect to the first screen by the input receiving unit, the advanced setting item and storing a configuration file that indicates setting of the advanced setting item in the second memory unit in a corresponding manner with the image forming apparatus; second-display-controlling that includes displaying the second screen on the display unit by making use of the configuration file; and request-sending that includes sending, according to an operation input received with respect to the second screen by the input receiving unit, an image forming request, in which is specified the setting of the advanced setting item indicated in the configuration file, as an image forming condition to the image forming apparatus.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 1 is a schematic diagram of an exemplary configuration of an image formation supporting system according to an embodiment of the present invention;

FIG. 9 illustrates an exemplary configuration file generated by the image-forming-apparatus control program for handheld devices according to the present embodiment;

FIG. 10 illustrates an exemplary configuration file generated by the image-forming-apparatus control program for handheld devices according to the present embodiment;

DETAILED DESCRIPTION OF THE PREFERRED EMBODIMENTS

Figure 2:
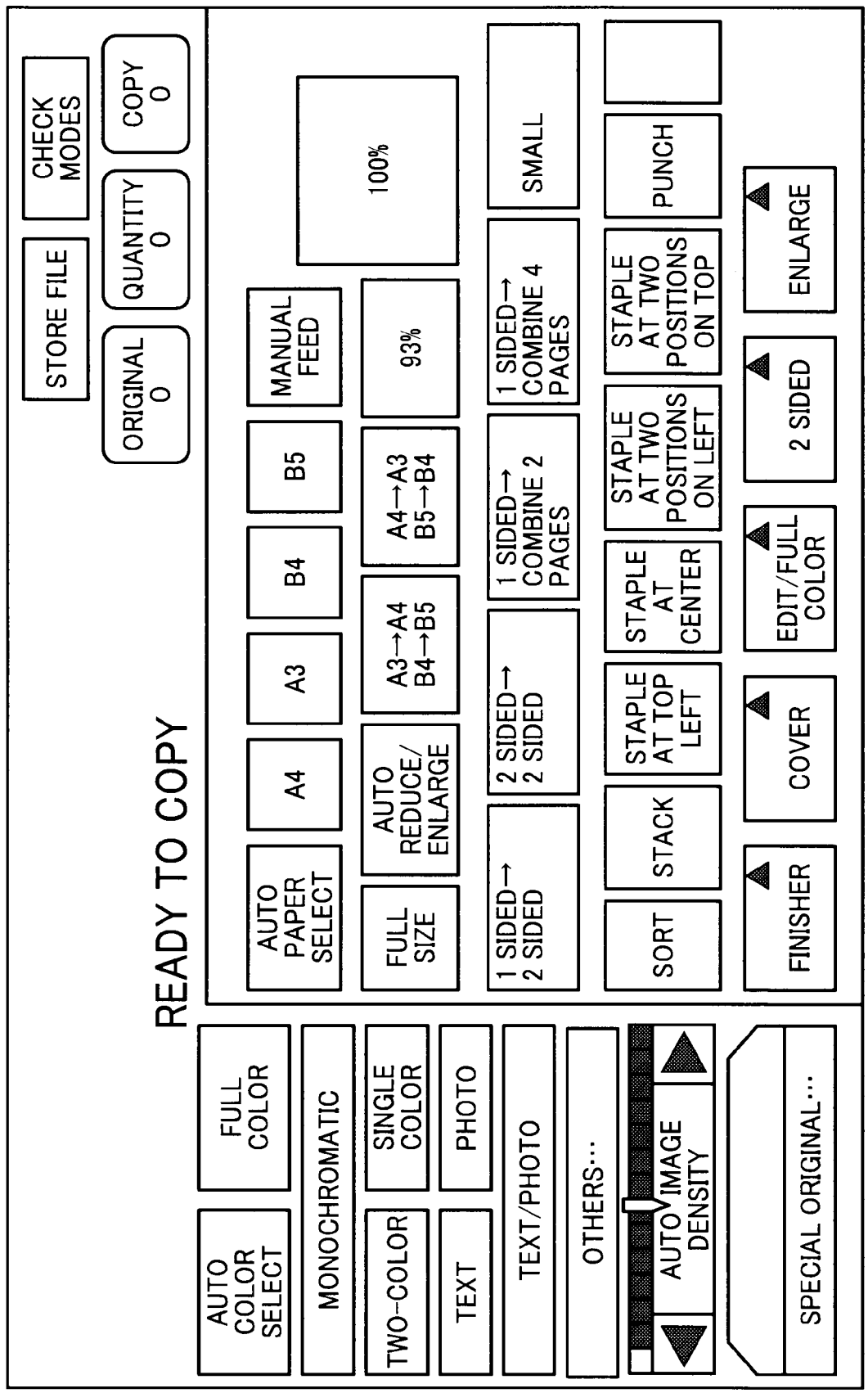
FIG. 2 is a front view of an operation display unit of the image forming apparatus illustrated in FIG. 1.

Exemplary embodiments of an image forming apparatus, an image formation supporting system, and an image formation supporting method according to the present invention are described in detail below with reference to the accompanying drawings. The present invention is not limited to these exemplary embodiments.

Firstly, an exemplary configuration of an image formation supporting system is explained below with reference to FIG. 1. The image formation supporting system includes an image forming apparatus 1 and a handheld device 2 that mutually perform wireless data communication. Given below is the general description of a hardware configuration of the image forming apparatus 1. In order to implement the image forming function, the image forming apparatus 1 includes an operation display unit 10, an engine unit 11, a scanner unit 12, a FAX unit 13, and a controller unit 14. The operation display unit 10 includes an operating unit (not illustrated) made of a plurality of hard keys and a display (not illustrated) made of a liquid crystal panel. The operation display unit 10 receives operation inputs performed by the users as well as displays a variety of information. Meanwhile, the operation display unit 10 can also be configured to be a touch-sensitive panel.

FIG. 2 is a front view of the operation display unit 10 of the image forming apparatus 1 illustrated in FIG. 1. In FIG. 2, the operation display unit 10 is assumed to be a touch-sensitive panel. On the operation display unit 10 are displayed the buttons (also referred to as "keys") for setting a plurality of advanced setting items for various image forming functions such as the copying function (reproducing function), the scanning function (image reading function), the FAX function (facsimile communication function), and the printer function (printing function). The advanced setting items represent the conditions for image formation (also referred to as "image forming conditions"). In FIG. 2, a setting screen is illustrated with the advanced setting items for the copying function such as "original scanning settings (1 sided/2 sided)", "output size with respect to original", "output paper size, "output concentration", and "output orientation". The user sets the advanced setting items for the copying function by touching the buttons displayed on the setting screen.

Returning to the explanation with reference to FIG. 1, the engine unit 11 represents, for example, a black-and-white line printer (B&W LP) or a color line printer (color LP. Based on image data, the engine unit 11 forms images and prints them on paper. The scanner unit 12 reads images from an original and generates image data representing the read images. The FAX unit 13 performs facsimile communication of image data. The controller unit 14 controls the image forming apparatus 1 in entirety and includes a central processing unit (CPU) 15, a memory 16, a memory device 17, and a wireless communication unit 18. The CPU 15 is a microcomputer that executes computer programs stored in the memory device 17 functioning as the work area for the purpose of controlling the image forming apparatus 1 in entirety and implementing various functions. The memory 16 is a memory device including a random access memory (RAM) and is used as the work area by the CPU 15 at the time of performing various operations. The wireless communication unit 18 performs data communication with the handheld device 2 on the basis of communication standards such as the wireless LAN standard (LAN stands for local area network), the Bluetooth standard, or the infrared standard.

The memory device 17 is a hard disk drive (HDD), a nonvolatile memory (e.g., a NAND-type flash memory, where NAND stands for inverted AND), a memory card such as a secure digital (SD) card (SD memory card), or a flash memory such as a USB flash memory (USB stands for universal serial bus). Meanwhile, as an example, it is also possible to simultaneously connect a plurality of memory devices of different types such as the HDD and the flash memory. The memory device 17 is used to store a variety of data such as various computer programs that the CPU 15 executes, the image data generated in the image forming apparatus 1, and the image data received by facsimile communication. Besides, the memory device 17 is also used to store an image-forming-apparatus control program for handheld devices that is executed by the handheld device 2 as described later. Herein, the image-forming-apparatus control program for handheld devices is configured in, for example, the "Java" format or the ".net" format ("JAVA" and ".net" being registered trademarks) that is not dependent on the hardware environment of the handheld device 2 in which the image-forming-apparatus control program for hardware devices is executed. That is, the image-forming-apparatus control program for hardware devices is configured in such a format that it can be executed as long as an environment program is available for the purpose of executing it. Meanwhile, the image-forming-apparatus control program for hardware devices includes unique information that enables identification the image forming apparatus 1.

Figure 3:
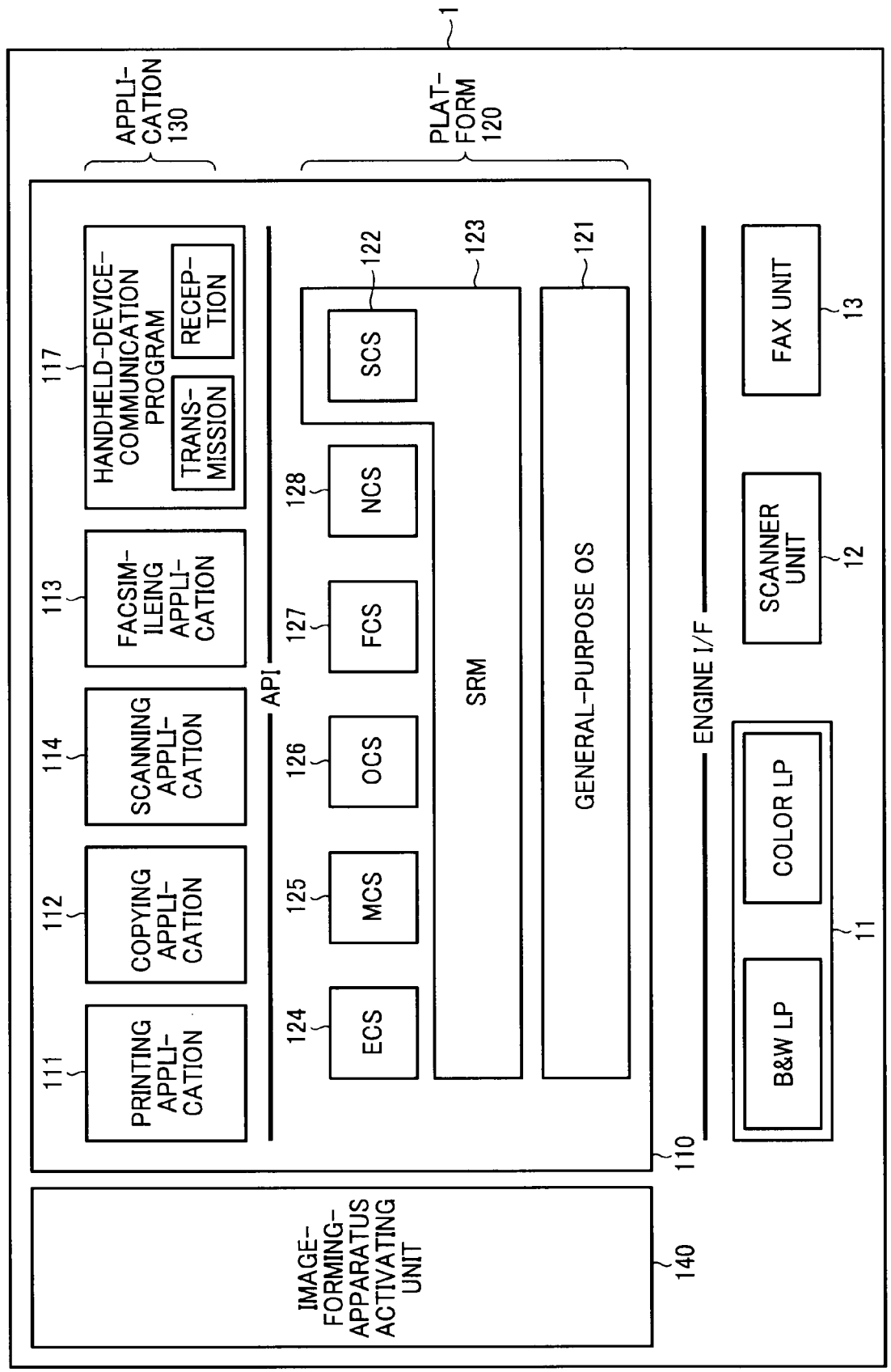
FIG. 3 is a schematic diagram of an exemplary software configuration of the image forming apparatus illustrated in FIG. 1.

Given below with reference to FIG. 3 is the general description of an exemplary software configuration composed of various programs stored in the memory device 17 of the image forming apparatus 1. The image forming apparatus 1 includes a software group 110 composed of a platform 120 and an application 130 as well as includes an image-forming-apparatus activating unit 140 that is executed when the image forming apparatus 1 is switched ON. The following description includes the explanation of functions that are implemented when the CPU 15 executes the computer programs related to the image-forming-apparatus activating unit 140 and the computer programs included in the software group 110. When the image forming apparatus 1 is switched ON, the image-forming-apparatus activating unit 140 is first executed so that the image forming apparatus 1 is initialized or diagnosed and the control services and the applications explained below are started. The platform 120 includes a control service for interpreting processing requests issued by the application 130 and causing generation of obtaining requests regarding hardware resources, includes a system resource manager (SRM) 123 for mediating the obtaining requests issued by the control service, and includes a general-purpose operating system (OS) 121.

The control services are composed of a plurality of service modules and include a system control service (SCS) 122, an engine control service (ECS) 124, a memory control service (MCS) 125, an operation panel control service (OCS) 126, a fax control service (FCS) 127, and a network control service (NCS) 128. Meanwhile, the platform 120 includes an application program interface (API) that enables reception of the processing requests from the application 130 using functions defined in advance.

The general-purpose OS 121 is a general-purpose OS such as UNIX (registered trademark). The processes of the SRM 123 perform system control and resource management along with the SCS 122. The processes of the SCS 122 performs application management, operation unit control, system screen display, light-emitting diode (LED) display, resource management, and interrupt application control. Particularly in the present embodiment, the processes of the SCS 122 receive a job in response to an image forming request from the handheld device 2 and control the execution of the job. Meanwhile, the SCS 122 can also be configured to implement the personal authentication function. Herein, the personal authentication means, for example, allowing a user to use the image forming apparatus 1 when the user code or the password input by that user from the operation display unit 10 matches with the user code or the password that is registered in advanced.

The processes of the ECS 124 control the hardware resources of the engine unit 11, the scanner unit 12, and the FAX unit 13. The processes of the MCS 125 perform processing related to the use of the memory 16 or the memory device 17. The processes of the FCS 127 perform the processing for facsimile communication. The NCS 128 provides services that can be commonly used with respect to applications requiring network input/output (I/O). That is, the NCS 128 includes the function of protocol processing for data communication.

The processes of the OCS 126 control the operation display unit 10 that functions as an operation panel. More particularly, from the operation panel, the OCS 126 obtains a key press as a key event and configures a key event function corresponding to the obtained key from a portion of the OCS processes sent to the SCS 122, from a drawing function for drawing various screens on the operation panel in response to a request from the application 130 or the control services, or from a portion of an OCS library in which is registered in advance a function for controlling the operation panel.

The application 130 includes a printing application 111 as the application for printing, a copying application 112 as the application for copying, a facsimileing application 113 as the application for facsimileing, and a scanning application 114 as the application for scanning. Besides, the application 130 also includes a handheld-device-communication program 117 that has the function of sending the image-forming-apparatus control program for handheld devices via the wireless communication unit 18 in response to a request from the handheld device 2 and the function of performing data communication with the handheld device 2. The handheld-device-communication program 117 can be loaded from a flash memory card or an SD card or can be downloaded from a server connected to a network and then installed in the image forming apparatus 1. The other applications can also be installed in the image forming apparatus 1 in an identical manner. Alternatively, instead of installing the applications in the image forming apparatus 1, it is also possible to run them directly from the flash memory card or the SD card.

Returning to the explanation with reference to FIG. 1, given below is the general description of a hardware configuration of the handheld device 2. Herein, the handheld device 2 can be a cellular phone or a handheld gaming gadget and includes an operation display unit 20, a memory unit 21, a wireless communication unit 22, a memory 23, and a CPU 24. The operation display unit 20 includes an operating unit (not illustrated) made of a plurality of hard keys and a display (not illustrated) made of a liquid crystal panel. The operation display unit 20 receives operation inputs performed by the users as well as displays a variety of information. Meanwhile, the operation display unit 20 can also be configured to be a touch-sensitive panel. The memory unit 21 is a storage device including a read only memory (ROM) or an HDD and is used to store the computer programs that the CPU 24 executes.

The wireless communication unit 22 performs data communication with the image forming apparatus 1 on the basis of communication standards such as the wireless LAN standard, the Bluetooth standard, or the infrared standard. The memory 23 is a memory device such as a RAM that is used by the CPU 24 as the work area at the time of performing various operations. By performing various operations using the memory 23 as the work area, the CPU 24 controls the handheld device 2 in entirety and implements various functions. Particularly, following functions are implemented in the present embodiment: a function of sending to the image forming apparatus 1 an image forming request via the wireless communication unit 22 in response to an operation input performed by the user from an implementation request screen described later; and a function of displaying on the operation display unit 20 a setting screen for setting in advance the advanced setting items regarding various functions as the image forming conditions at the time of requesting image formation and customizing the implementation request screen depending on the operation input performed by the user.

Figure 4:
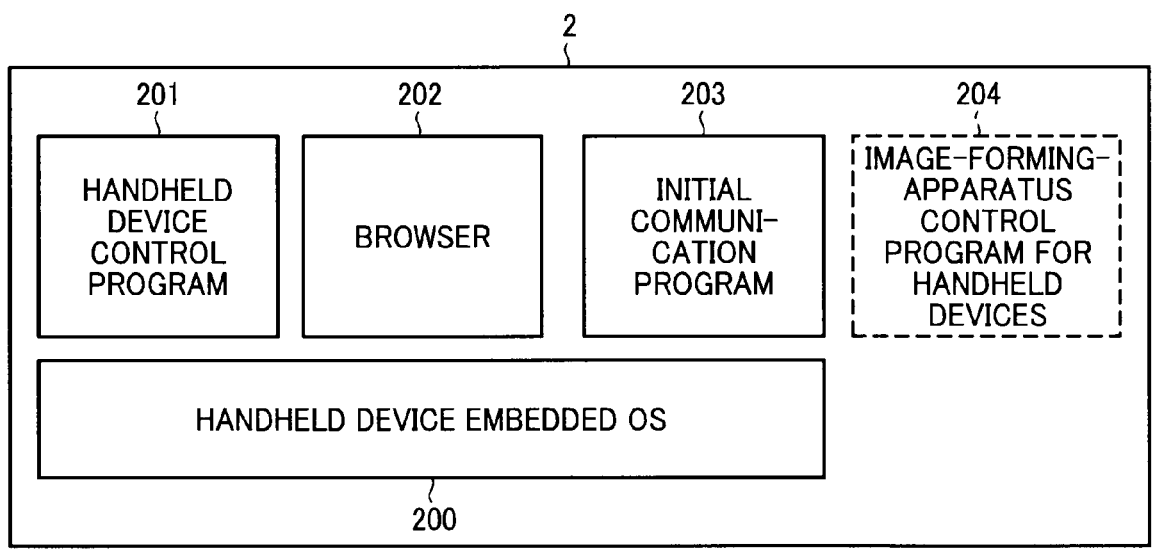
FIG. 4 is a schematic diagram of an exemplary software configuration of a handheld device according to the present embodiment.

Given below with reference to FIG. 4 is the general description of a software configuration composed of various computer programs stored in the memory unit 21 of the handheld device 2. The handheld device 2 includes a handheld device embedded OS 200, a handheld device control program 201, a browser 202, and an initial communication program 203. The following description includes the explanation regarding the functions implemented when the CPU 24 executes the abovementioned computer programs. The handheld device embedded OS 200 performs management of the memory 23 or the memory unit 21, performs task management, and performs input-output management. Moreover, the handheld device embedded OS 200 can also be configured to have a network function or a file system function for controlling the communication via a network. As the handheld device embedded OS 200, for example, a UNIX-like operating system based on LINUX is used. The handheld device control program 201 controls the handheld device 2 in entirety. The browser 202 displays web pages on the operation display unit 20 as well as displays images representing image data or documents representing document data on the operation display unit 20. Meanwhile, the handheld device 2 can also be configured without the browser 202. The initial communication program 203 performs data communication with the image forming apparatus 1. More particularly, depending on an operation input performed by the user from the operation display unit 20 and depending on a predetermined determination condition, the initial communication program 203 receives the image-forming-apparatus control program for handheld devices and stores it in the memory unit 21. That is, an image-forming-apparatus control program for handheld devices 204 is added to the exemplary software configuration illustrated in FIG. 4. Besides, depending on an operation input performed by the user from the operation display unit 20, the initial communication program 203 sends an image forming request to the image forming apparatus 1.

Depending on an operation input performed by the user from the operation display unit 20, the image-forming-apparatus control program for handheld devices 204 displays a setting screen on the operation display unit 20 for the purpose of setting the advanced setting items of each function related to image formation. Depending on an operation input performed from the setting screen, the image-forming-apparatus control program for handheld devices 204 sets the advanced settings; and depending on the advanced setting items that have been set, the image-forming-apparatus control program for handheld devices 204 displays an implementation request screen on the operation display unit 20 for the purpose of requesting the image forming apparatus 1 to perform image formation. Besides, at the time of setting the advanced settings in response to the operation input performed from the setting screen, the image-forming-apparatus control program for handheld devices 204 generates a configuration file and stores it in the memory unit 21 in a corresponding manner with the image forming apparatus 1. Subsequently, at the time of displaying an implementation request screen on the operation display unit 20, the image-forming-apparatus control program for handheld devices 204 reads the configuration file from the memory unit 21 and uses it to display the implementation request screen on the operation display unit 20.

Figure 5:
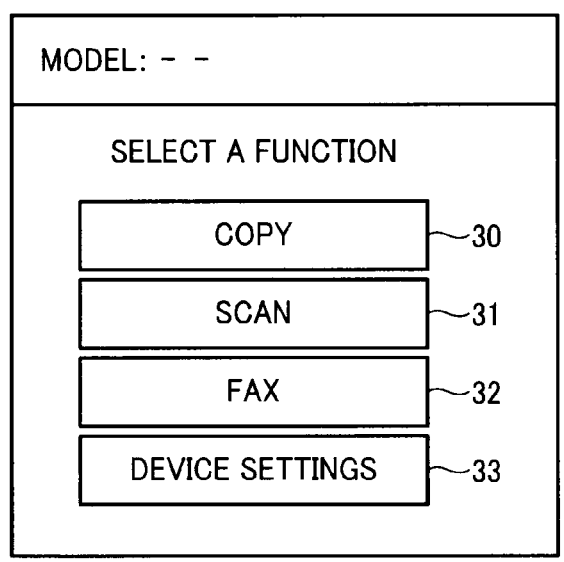
FIG. 5 illustrates an exemplary setting screen displayed by an image-forming-apparatus control program for handheld devices on an operation display unit of the handheld device according to the present embodiment.
Figure 6:
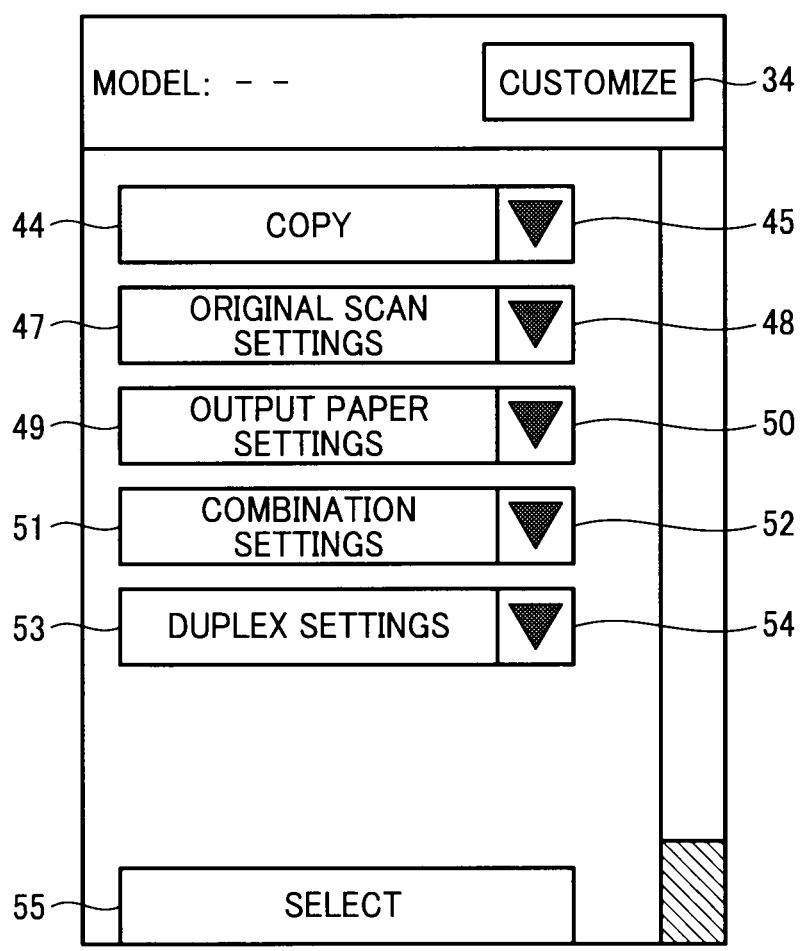
FIG. 6 illustrates an exemplary setting screen displayed by the image-forming-apparatus control program for handheld devices on the operation display unit of the handheld device according to the present embodiment.
Figure 7:
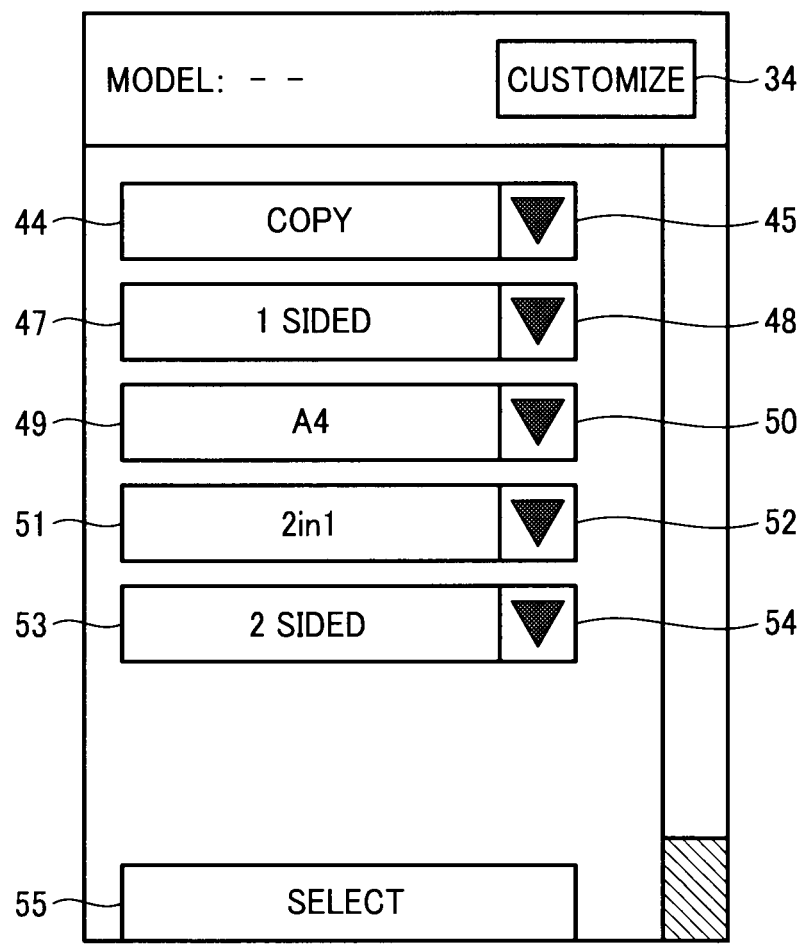
FIG. 7 illustrates an exemplary setting screen displayed by the image-forming-apparatus control program for handheld devices on the operation display unit of the handheld device according to the present embodiment.
Figure 8:
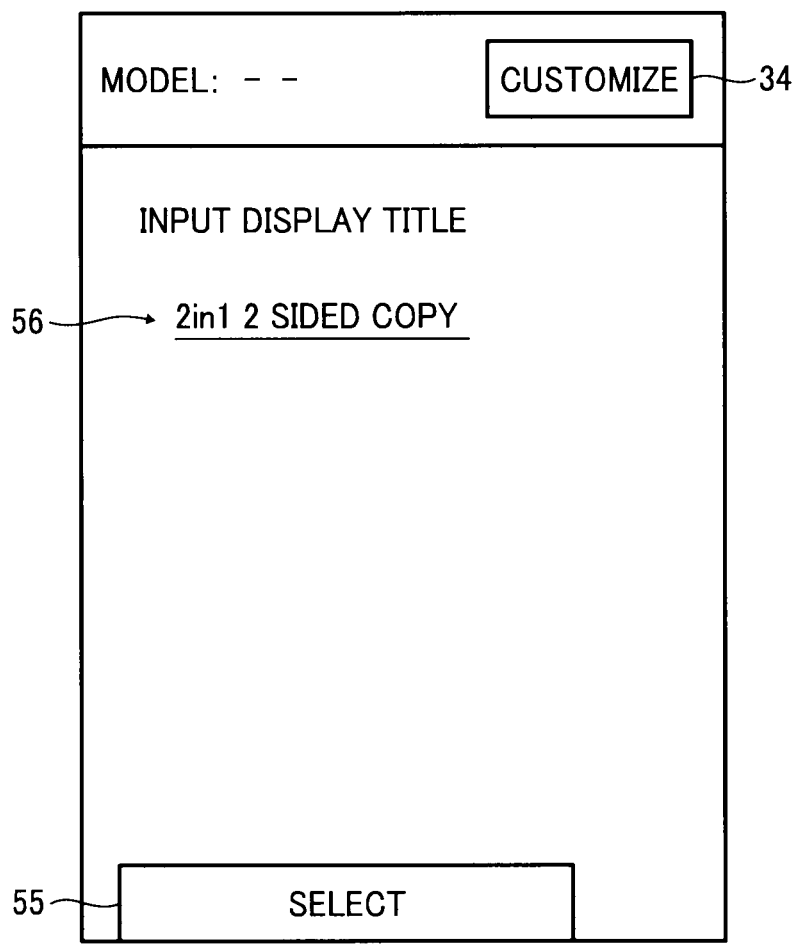
FIG. 8 illustrates an exemplary setting screen displayed by the image-forming-apparatus control program for handheld devices on the operation display unit of the handheld device according to the present embodiment.

Regarding the setting screens displayed by the image-forming-apparatus control program for handheld devices 204 on the operation display unit 20, the description is given below with reference to FIGS. 5 to 8. Firstly, as illustrated in FIG. 5, a setting screen (initial setting screen) is displayed on the operation display unit 20 for the purpose of selecting a target function for setting the advanced setting items. Herein, buttons 30 to 33 represent the buttons for selecting various functions. For example, consider a case when an operation input is performed to select the copying function from the setting screen illustrated in FIG. 5. In other words, consider a case when a button 44 is selected and followed by the pressing of a "select" button 55. In that case, as illustrated in FIG. 6, a setting screen is displayed on the operation display unit 20 for the purpose of setting the advanced setting items also including the target function for settings (in this case, the copying function). Subsequently, consider a case when an operation input is performed to perform setting of each advanced setting item in the setting screen illustrated in FIG. 6. In other words, consider a case when the advanced setting items are selected from pull-down menus 45, 48, 50, 52, and 54 of list boxes 44, 47, 49, 51, and 53, respectively, and followed by the pressing of the "select" button 55 as illustrated in FIG. 7. In that case, the advanced setting items related to the copying function are set and a configuration file related to those settings is generated. Meanwhile, as illustrated in FIG. 8, the user is allowed to input a title (56) for the settings.

Given below with reference to FIG. 9 is the description of the configuration file generated by the image-forming-apparatus control program for handheld devices 204. In FIG. 9 is illustrated an exemplary configuration file regarding the copying function for which the advanced setting items are set from the setting screen illustrated in FIGS. 5 to 8. In the first line illustrated in FIG. 9 is specified the title that has been input for the settings. The second line to the sixth line respectively correspond to the items selected from the pull-down menus 45, 48, 50, 52, and 54 of the list boxes 44, 47, 49, 51, and 53. Herein, in an advanced setting item "function", it is specified that the settings are related to the copying function; in an advanced setting item "scan_side", it is specified that the original is to be scanned on one side; in an advanced setting item "Nin1", it is specified that two pages are to be combined in a single page; in an advanced setting item "paper_size", it is specified that the output paper size is A4; and in an advanced setting item "print_side", it is specified that both sides of the paper are to be used for the output. With respect to such a configuration file, for example, the image-forming-apparatus control program for handheld devices 204 stores in the memory unit 21 the file name including the MAC address (MAC stands for media access control) allotted to the image forming apparatus 1. Hence, the configuration file is stored in a corresponding manner with the image forming apparatus 1. Meanwhile, the example illustrated in FIG. 9 is given for a configuration file of the ".ini" format. Alternatively, the configuration file can also be in the ".xml" format or in the ".csv" format. Moreover, in the case when a plurality of settings are performed with respect to the image forming function in a single image forming apparatus 1; then, as illustrated in FIG. 10, the image-forming-apparatus control program for handheld devices 204 generates a configuration file in such a way that the plurality of settings are specified in the same configuration file.

Figure 11:
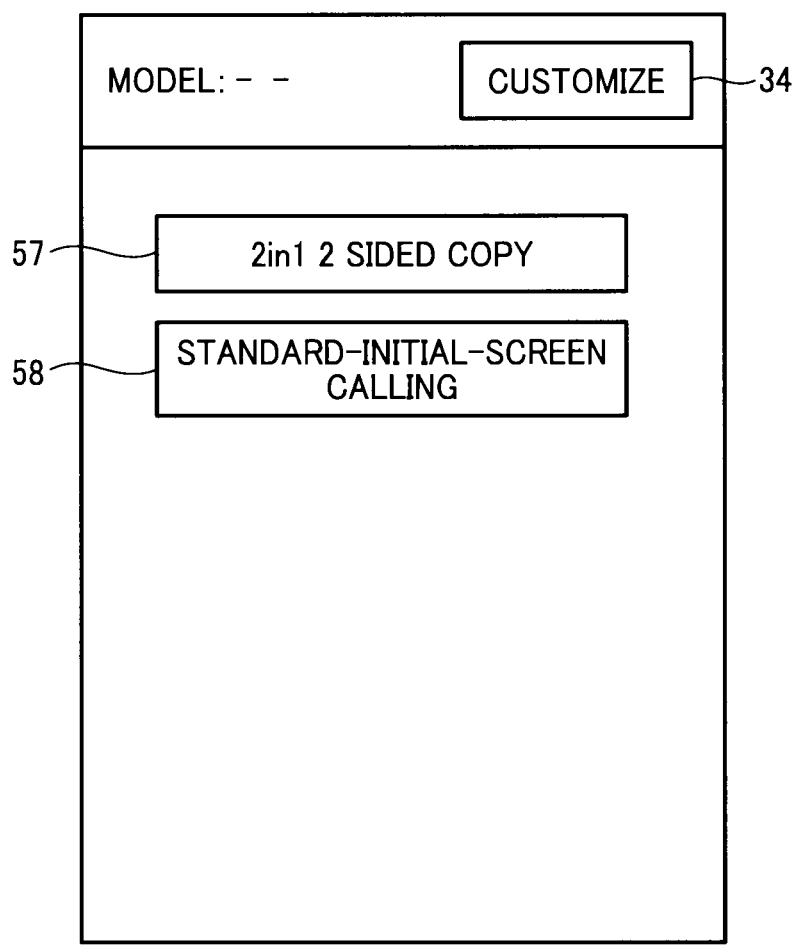
FIG. 11 illustrates an exemplary implementation request screen that the image-forming-apparatus control program for handheld devices displays on the operation display unit of the handheld device using the configuration file according to the present embodiment.

Explained below with reference to FIG. 11 is an implementation request screen that the image-forming-apparatus control program for handheld devices 204 displays on the operation display unit 20 using the configuration file. As illustrated in FIG. 11, a button 57 is displayed that indicates the title "2in1 2 sided copy" as specified in the configuration file illustrated in FIG. 9. Besides, in the implementation request screen, a standard-initial-screen calling button 58 is displayed for the purpose of calling a standard implementation request screen. When the button 58 is pressed in the implementation request screen; the image-forming-apparatus control program for handheld devices 204 selects the settings in the configuration file corresponding to the title indicated by the button 57, specifies the image forming conditions according to the selected settings, and sends an image forming request to the image forming apparatus 1 via the initial communication program. For example, in response to the pressing of the button 58, the image-forming-apparatus control program for handheld devices 204 specifies the image forming conditions as follows: the original is to be scanned on one side; the output paper size is A4; two pages are to be combined in a single page; and both sides of the paper are to be used for the output. Then, the image-forming-apparatus control program for handheld devices 204 sends to the image forming apparatus 1 an image forming request for requesting image formation by implementing the copying function. Subsequently, according to the image forming request, the image forming apparatus 1 performs image formation. Meanwhile, upon receiving an image forming request, regarding the advanced setting items that were not set in the configuration file, the image forming apparatus 1 sets default settings in the image forming conditions and then performs image formation.

Figure 12:
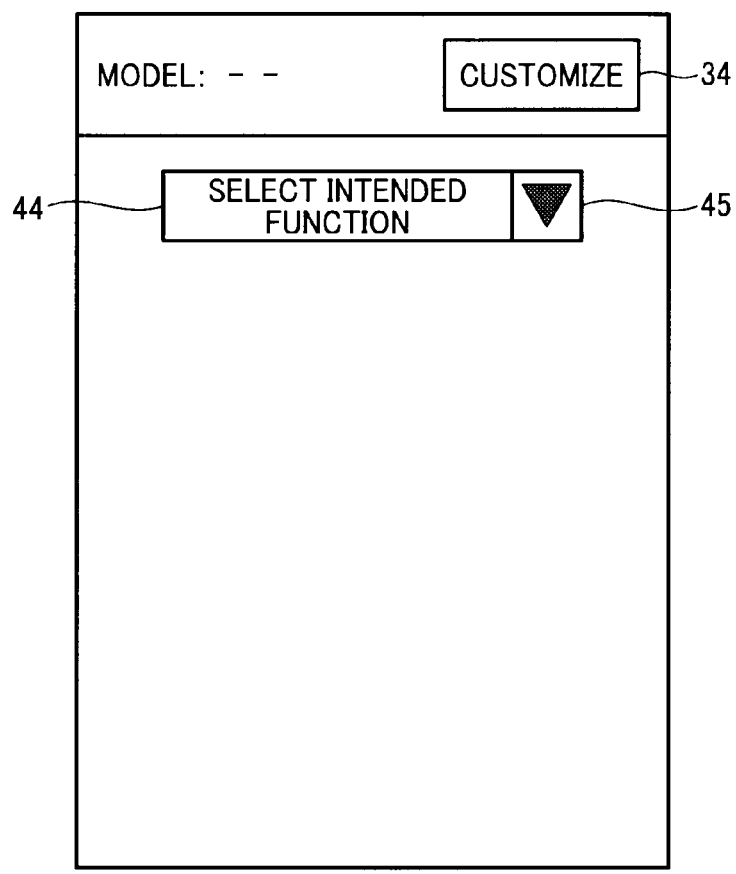
FIG. 12 illustrates an exemplary setting screen for the purpose of selecting a target function for setting advanced setting items according to the present embodiment.
Figure 13:
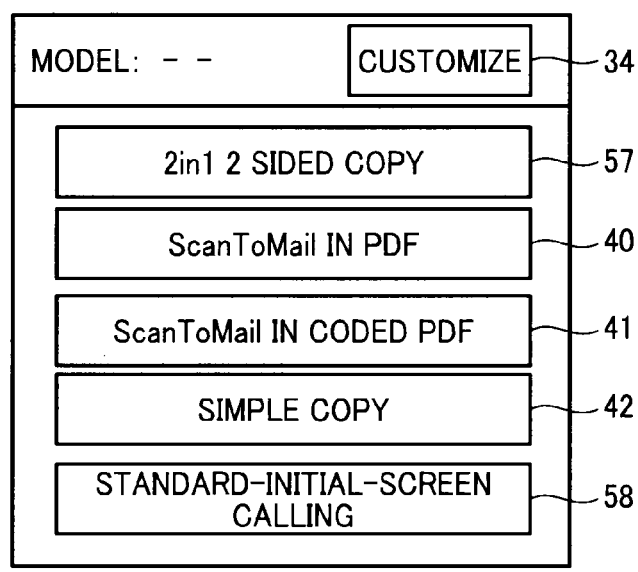
FIG. 13 illustrates an exemplary implementation request screen according to the present embodiment.

In response to an operation input requesting customization from the implementation request screen displayed on the operation display unit 20, the image-forming-apparatus control program for handheld devices 204 displays the setting screen on the operation display unit 20 and, in response to the operation input performed by the user from the setting screen, updates the configuration file stored in the memory unit 21 so that the implementation request screen is appropriately customized. For example, an operation input for requesting customization can be performed by pressing a "customize" button 34 displayed on the implementation request screen illustrated in FIG. 11. In response to that operation input, the image-forming-apparatus control program for handheld devices 204 displays on the operation display unit 20 a setting screen as illustrated in FIG. 12 for the purpose of selecting a target function for setting the advanced setting items. Subsequently, if, for example, the copying function is selected as the target function for setting the advanced setting items; then the setting screens illustrated in FIGS. 6 to 8 are displayed on the operation display unit 20. Meanwhile, although it is possible that the advanced setting items differ for each target function for setting the advanced setting items, the setting screens are displayed in a similar manner. As a result of the customization, the image-forming-apparatus control program for handheld devices 204 updates the configuration file stored in the memory unit 21 and, in response to an operation input performed by the user, displays an implementation request screen as illustrated in FIG. 13 on the operation display unit 20. In the implementation request screen illustrated in FIG. 13, the button 57 and buttons 40 to 42 are displayed that respectively indicate titles "2in1 2 sided copy", "ScanTo-Mail in PDF", "ScanToMail in coded PDF", and "simple copy" corresponding to each set of settings from among a plurality of sets of settings. Besides, in the implementation request screen, the standard-initial-screen calling button 58 is displayed for the purpose of calling the standard implementation request screen that is not customized.

Explained below is the sequence of operations performed in the image formation supporting system according to the present embodiment. Firstly, the explanation is given with reference to FIG. 14 about the sequence of operations performed by the handheld device 2 to obtain the image-forming-apparatus control program for handheld devices from the image forming apparatus 1. Herein, it is assumed that a single image forming apparatus 1 is present within the range in which the handheld device 2 can perform communication via the wireless communication unit 22. When the initial communication program is started in response to an operation input performed by the user from the operation display unit 20 (Step S1), the CPU 24 of the handheld device 2 searches for image forming apparatuses within the range in which it can perform communication via the wireless communication unit 22 (Step S2). During that search, the CPU 24 sends out inquiries by broadcast via the wireless communication unit 22 (i.e., sends inquiry data to an unspecified number of destinations by means of wireless communication).

Meanwhile, upon switching ON the power of the image forming apparatus 1, the CPU 15 executes the handheld-device-communication program. When the CPU 15 receives the inquiry data from the handheld device 2 via the wireless communication unit 18, it notifies the handheld device 2 that the image forming apparatus 1 is present within the communicable range of the handheld device 2 (Step S3). Upon receiving that response, the CPU 24 determines that the image forming apparatus 1 is present within the communicable range thereof. Subsequently, based on a predetermined determination condition, the CPU 24 determines whether to obtain the image-forming-apparatus control program for handheld devices from the image forming apparatus 1 (Step S4). The details regarding the determination based on the predetermined determination condition are given later. If it is determined to obtain the image-forming-apparatus control program for handheld devices from the image forming apparatus 1, then the CPU 24 sends to the image forming apparatus 1 a request to send the image-forming-apparatus control program for handheld devices (Step S5). In response to that request, the image forming apparatus 1 reads from the memory device 17 the image-forming-apparatus control program for handheld devices including unique information that enables identification the image forming apparatus 1 and then sends that program to the handheld device 2 (Step S6). Upon receiving the image-forming-apparatus control program for handheld devices, the CPU 24 of the handheld device 2 stores it in the memory unit 21 (Step S7) and executes it upon loading (Step S8). Meanwhile, until the execution of the image-forming-apparatus control program for handheld devices is complete, the execution of the initial communication program is terminated.

Subsequently, the CPU 24 displays the initial setting screen as illustrated in FIG. 5 on the operation display unit 20. In response to the operation input performed by the user from the initial setting screen, the CPU 24 displays the setting screen as illustrated in FIG. 6 on the operation display unit 20. Then, in response to the operation input performed by the user from that setting screen, the CPU 24 displays the setting screen as illustrated in FIG. 7 on the operation display unit 20. Subsequently, in response to the operation input performed by the user from that setting screen, the CPU 24 generates a configuration file and stores it in the memory unit 21. Using that configuration file, the CPU 24 displays the implementation request screen as illustrated in FIG. 11 on the operation display unit 20.

Figure 14:
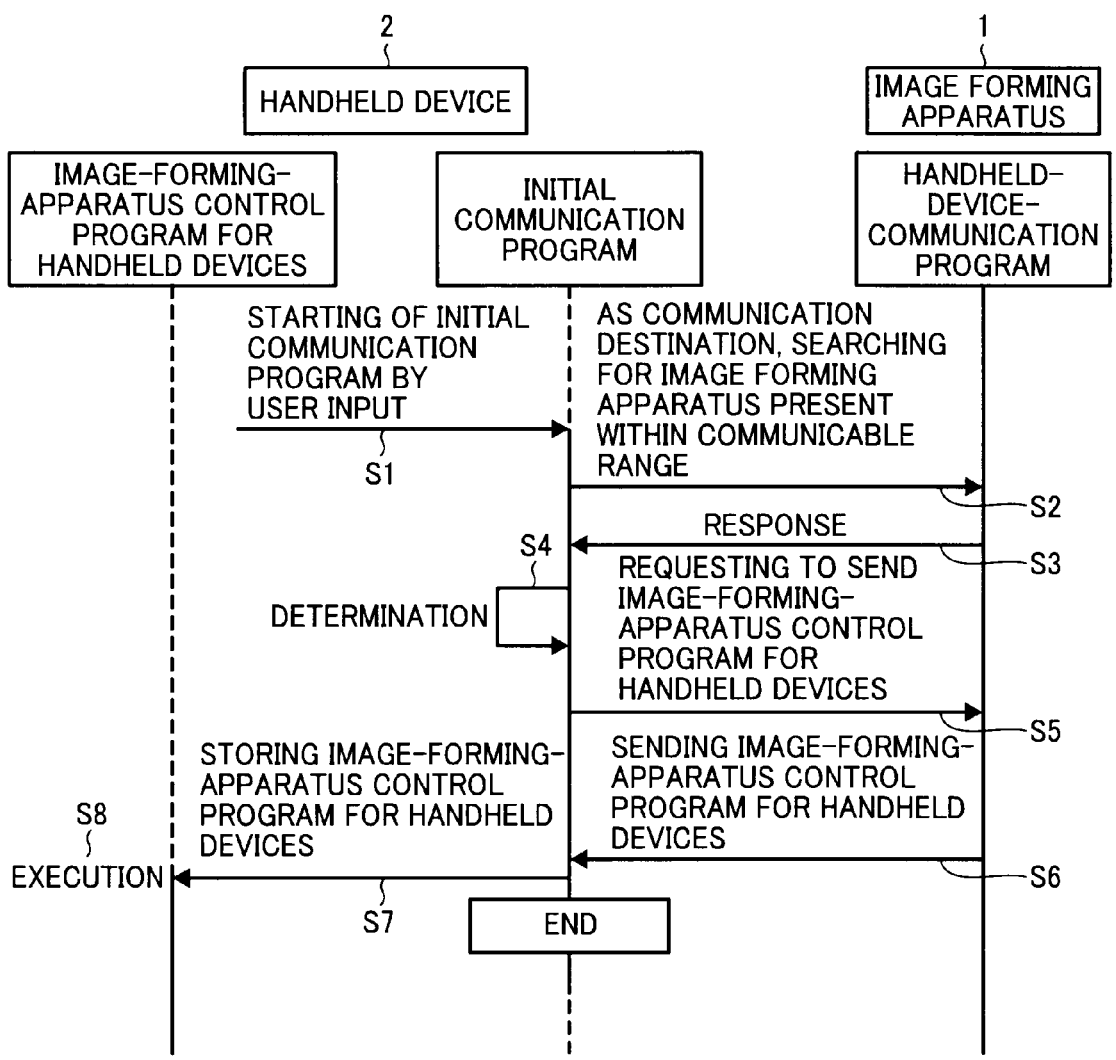
FIG. 14 is a sequence diagram for explaining the sequence of operations performed by the handheld device to obtain the image-forming-apparatus control program for handheld devices from the image forming apparatus according to the present embodiment.
Figure 15:
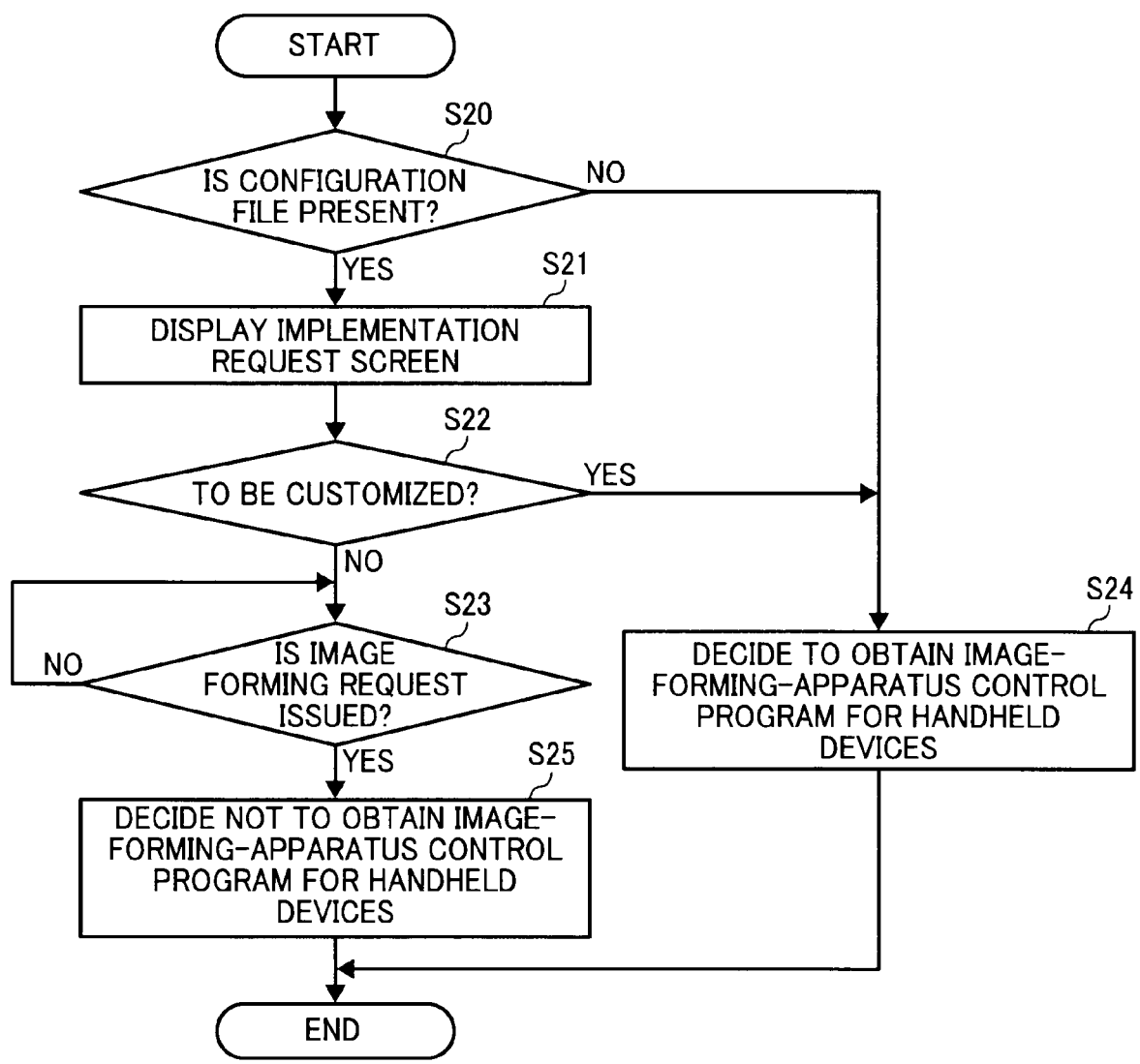
FIG. 15 is a flowchart for explaining the sequence of operations regarding the determination performed at Step S4 illustrated in FIG. 14 based on a predetermined determination condition.

Explained below with reference to FIG. 15 is the sequence of operations regarding the determination performed at Step S4 based on the predetermined determination condition. Firstly, the CPU 24 of the handheld device 2 determines whether the configuration file is stored in the memory unit 21 (Step S20). If the configuration file is not stored (No at Step S20), then the CPU 24 decides to obtain the image-forming-apparatus control program for handheld devices from the image forming apparatus 1 (Step S24) and proceeds to Step S5 illustrated in FIG. 14. On the other hand, if the configuration file is stored (Yes at Step S20), then the CPU 24 displays the implementation request screen on the operation display unit 20 using the configuration file (Step S21). If an operation input for requesting customization is performed from that implementation request screen (Yes at Step S22), then the CPU 24 decides to obtain the image-forming-apparatus control program for handheld devices from the image forming apparatus 1 (Step S24) and proceeds to Step S5 illustrated in FIG. 14. Thus, the predetermined determination condition is that the image-forming-apparatus control program for handheld devices is obtained from the image forming apparatus 1 either when the configuration file is not stored in the memory unit 21 or when the configuration file is stored in the memory unit 21 and an operation input for requesting customization is performed.

Meanwhile, if an operation input for requesting customization is not performed (No at Step S22) but if an operation input for requesting image formation is performed (Yes at Step S23), then the CPU 24 decides not to obtain the image-forming-apparatus control program for handheld devices from the image forming apparatus 1 (Step S25) and sends an image forming request to the image forming apparatus 1. The details regarding that operation are given later.

Under the condition in which the configuration file is not stored in the memory unit 21 (No at Step S20); when the image-forming-apparatus control program for handheld devices that is received from the image forming apparatus 1 is executed from Step S5 to Step S8 illustrated in FIG. 14, the CPU 24 displays the initial setting screen as illustrated in FIG. 5. Then, in response to the operation input performed by the user, the CPU 24 changes the setting screens displayed on the operation display unit 20 as illustrated in FIGS. 6 to 8, generates a configuration file, and stores it in the memory unit 21. Using that configuration file, the CPU 24 then displays the implementation request screen as illustrated in FIG. 11 on the operation display unit 20. If an operation input for requesting image formation is performed from the implementation request screen; then the CPU 24 ends the execution of the image-forming-apparatus control program for handheld devices, restarts the execution of the initial communication program, and issues an image forming request to the image forming apparatus 1.

Under the condition in which the configuration file is stored in the memory unit 21 (Yes at Step S20); when an operation input for requesting customization is performed from the implementation request screen at Step S22 illustrated in FIG. 15 and the image-forming-apparatus control program for handheld devices that is received from the image forming apparatus 1 is executed from Step S5 to Step S8 illustrated in FIG. 14, the CPU 24 displays the initial setting screen as illustrated in FIG. 12. Then, in response to the operation input performed by the user, the CPU 24 changes the setting screens displayed on the operation display unit 20 as illustrated in FIGS. 6 to 8 and updates the configuration file stored in the memory unit 21. Using that configuration file, the CPU 24 then displays the implementation request screen as illustrated in FIG. 13 on the operation display unit 20. If an operation input for requesting image formation is performed from the implementation request screen; then the CPU 24 ends the execution of the image-forming-apparatus control program for handheld devices, restarts the execution of the initial communication program, and issues an image forming request to the image forming apparatus 1.

Figure 16:
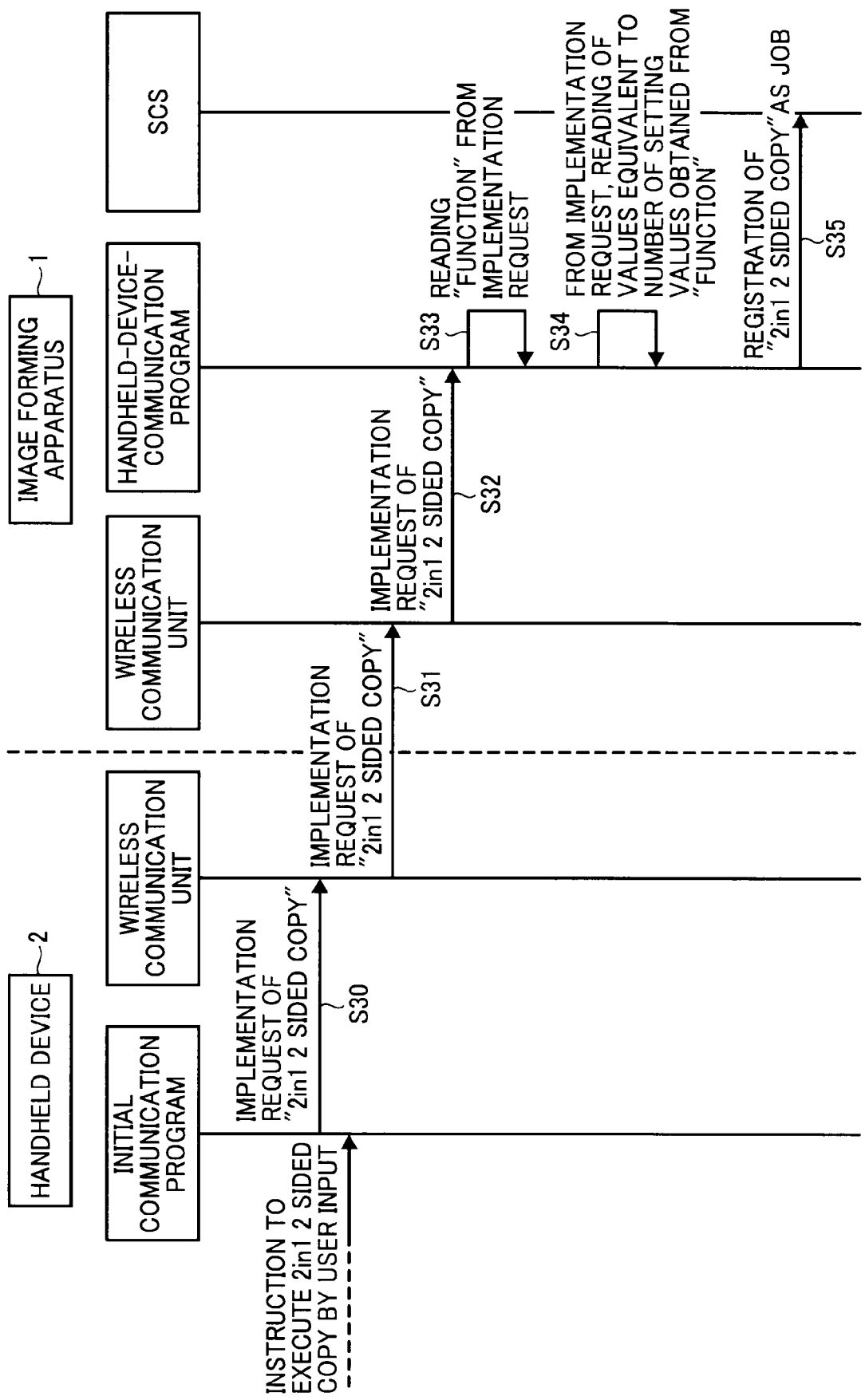
FIG. 16 is a sequence diagram for explaining the sequence of operations for issuing an image forming request to the image forming apparatus subsequent to Step S25 illustrated in FIG. 14.

Explained below with reference to FIG. 16 is the sequence of operations for issuing an image forming request to the image forming apparatus 1 subsequent to Step S25 illustrated in FIG. 14. For example, assume that the user sets an original in the scanner unit 12 of the image forming apparatus 1 and performs an operation input of pressing the button 57 indicating "2in1 2 sided copy" from the implementation request screen (e.g., see FIG. 11) displayed on the operation display unit 20 of the handheld device 2. In that case, by executing the initial communication program, the CPU 24 of the handheld device 2 refers to the configuration file that is stored in the memory unit 21 in a corresponding manner with the image forming apparatus 1, reads from the configuration file the information regarding the settings including the title "2in1 2 sided copy" as illustrated in FIG. 9, and sends to the wireless communication unit 22 an image forming request (implementation request regarding 2in1 2 sided copy) in which the information regarding the settings except the title (i.e., information regarding "function", "scan_side", "Nin1", "paper_size", and "print_size") is specified as the image forming conditions (Step S30). The wireless communication unit 22 then sends the image forming request to the image forming apparatus 1 (Step S31).

In the image forming apparatus 1, the wireless communication unit 18 receives the image forming request sent at Step S31 and transfers that request to the handheld-device-communication program running in the CPU 15 (Step S32). When the handheld-device-communication program receives the image forming request at Step S32, the CPU 15 analyzes the image forming conditions specified in the image forming request. More particularly, as each image forming condition, the CPU 15 determines "function" specified in the image forming request for determining the function (herein, the copying function) that is to be implemented for the formation of target images (Step S33), determines "scan_side" for determining the reading sides (herein, single-side) of the original, determines "Nin1" for determining the number of pages (herein, two pages) to be combined, determines "paper_size" for determining the output paper size (herein, the A4-size), and determines "print_side" for determining whether a single side or both sides of the paper are to be used for the output (herein, both sides to be used) (Step S34). Then, the CPU 15 requests the SCS 122 to register the image forming request as a job (Step S35). In response to that request, the SCS 122 receives a job specific to the image forming request and controls the execution of that job. As a result of executing the job, the image forming apparatus 1 reads images from an original set by the user in the scanner unit 12 of the image forming apparatus 1 and, using those images and following the image forming conditions specified in the image forming request received from the handheld device 2, combines two pages of images on a single page and performs image formation on both sides of A4-size papers.

Figure 17:
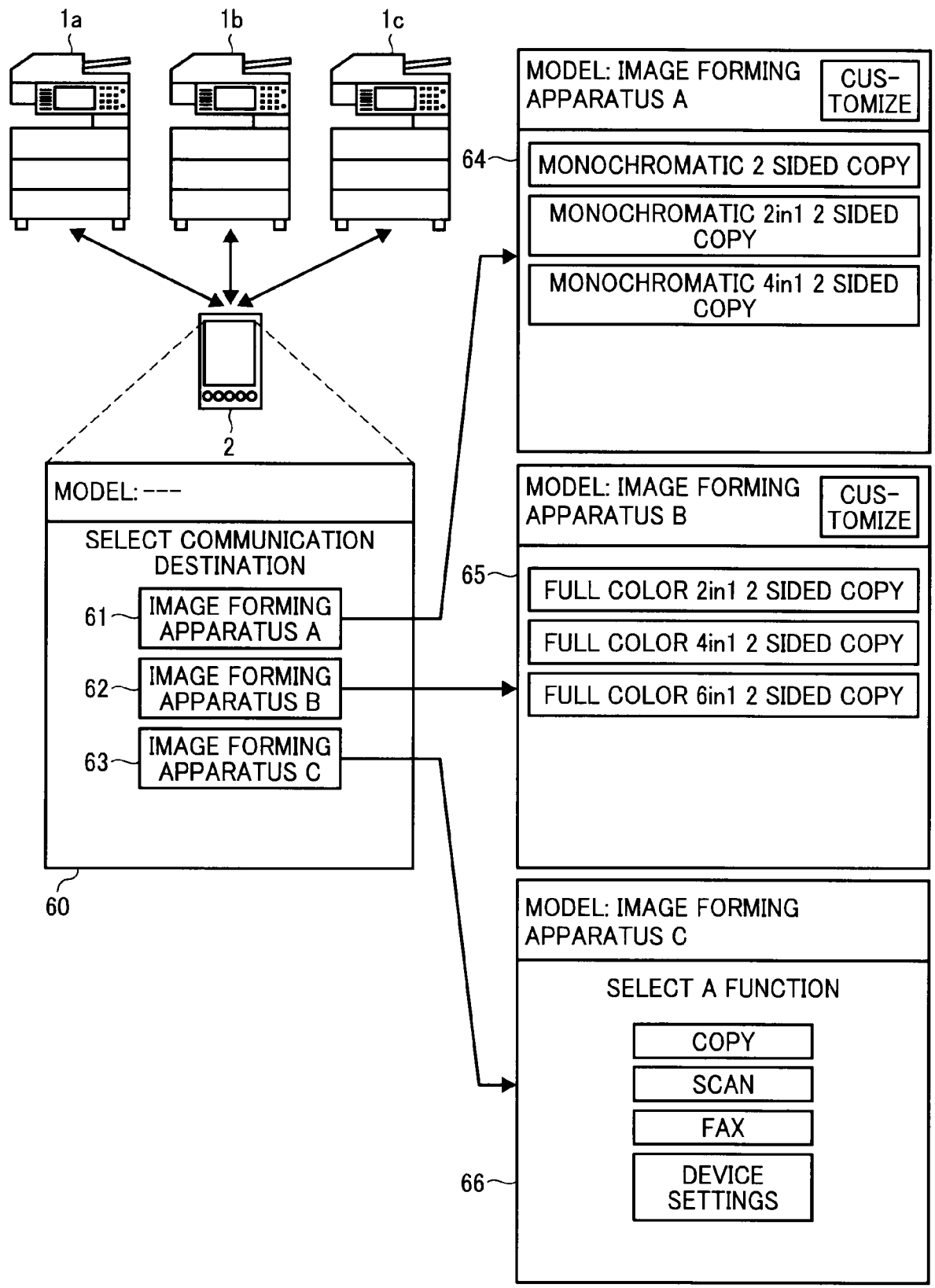
FIG. 17 is a schematic diagram of an exemplary display on the operation display unit of the handheld device when the image forming apparatus is present in plurality within the communicable range of the handheld device.

Explained below is a case when a plurality of image forming apparatuses is present within the communicable range of the handheld device 2. FIG. 17 is a schematic diagram of an exemplary display on the operation display unit 20 of the handheld device 2 when the image forming apparatus 1 is present in plurality within the communicable range of the handheld device 2. In this case, in the memory unit 21 of the handheld device 2, the configuration file for each image forming apparatus 1 with which the communication has been performed at least once is stored in a corresponding manner with that image forming apparatus 1. Based on the configuration files corresponding to the communicable image forming apparatuses 1, the CPU 24 of the handheld device 2 displays the customized implementation request screen on the operation display unit 20.

In an identical manner to that described above, the CPU 24 of the handheld device 2 then starts the initial communication program and searches for image forming apparatuses within its communicable range. If the image forming apparatus 1 is present in plurality within the communicable range, then the CPU 24 displays on the operation display unit 20 a selection screen illustrating the list of communicable image forming apparatuses 1 and prompts the user to select one of the image forming apparatuses 1 as the target image forming apparatus for communication. In the example illustrated in FIG. 17, an image forming apparatus A (1a), an image forming apparatus B (1b), and an image forming apparatus C (1c) are the three image forming apparatuses present within the communicable range of the handheld device 2. The user is able to select any one of these three image forming apparatuses as the target image forming apparatus for communication. Herein, it is assumed that the image forming apparatuses 1a to 1c have an identical configuration to that of the image forming apparatus 1. However, for example, it can be assumed that the image forming apparatus 1a has a faster printing speed but is only capable of monochrome printing and that the image forming apparatus 1b has a slower printing speed than the image forming apparatus 1a but is capable of color printing. Then, in the case of printing a large volume, the user may select the image forming apparatus 1a; and in the case of requiring color prints, the user may select the image forming apparatus 1b.

Assume that the user selects from the operation display unit 20 one of the image forming apparatuses 1 as the target image forming apparatus for communication. Then, if the configuration file corresponding to the selected image forming apparatus 1 is stored in the memory unit 21, then the CPU 24 displays on the operation display unit 20 an implementation request screen using that configuration file. On the other hand, if the configuration file corresponding to the selected image forming apparatus 1 is not stored in the memory unit 21, then the CPU 24 sends to the selected image forming apparatus 1 a request to send the image-forming-apparatus control program for handheld devices and, upon receiving the image-forming-apparatus control program for handheld devices, executes it and displays the initial setting screen on the operation display unit 20. While executing the image-forming-apparatus control program for handheld devices, the CPU 24 terminates the execution of the initial communication program until the execution of the image-forming-apparatus control program for handheld devices is complete.

In the example illustrated in FIG. 17, it is assumed that the handheld device 2 has previously performed communication with the image forming apparatuses 1a and 1b and the implementation request screen has been customized accordingly. Thus, the configuration files corresponding to the image forming apparatuses 1a and 1b are stored in the memory unit 21. If an operation input of selecting the image forming apparatus 1a is performed from a selection screen 60 (by pressing a button 61), then the CPU 24 reads the configuration file corresponding to the image forming apparatus 1a from the memory unit 21 and displays an implementation request screen 64 on the operation display unit 20 using the read configuration file. Similarly, if an operation input of selecting the image forming apparatus 1b is performed from the selection screen 60 (by pressing a button 62), then the CPU 24 reads the configuration file corresponding to the image forming apparatus 1b from the memory unit 21 and displays an implementation request screen 65 on the operation display unit 20 using the read configuration file. Meanwhile, it is assumed that the handheld device 2 has not yet performed communication with the image forming apparatus 1c and thus no configuration file corresponding to the image forming apparatus 1c is stored in the memory unit 21. Hence, if an operation input of selecting the image forming apparatus 1c is performed from the selection screen 60 (by pressing a button 63), then the CPU 24 obtains the image-forming-apparatus control program for handheld devices from the image forming apparatus 1c, executes the image-forming-apparatus control program for handheld devices, and displays an initial setting screen 66 identical to that illustrated in FIG. 5 on the operation display unit 20.

Figure 18:
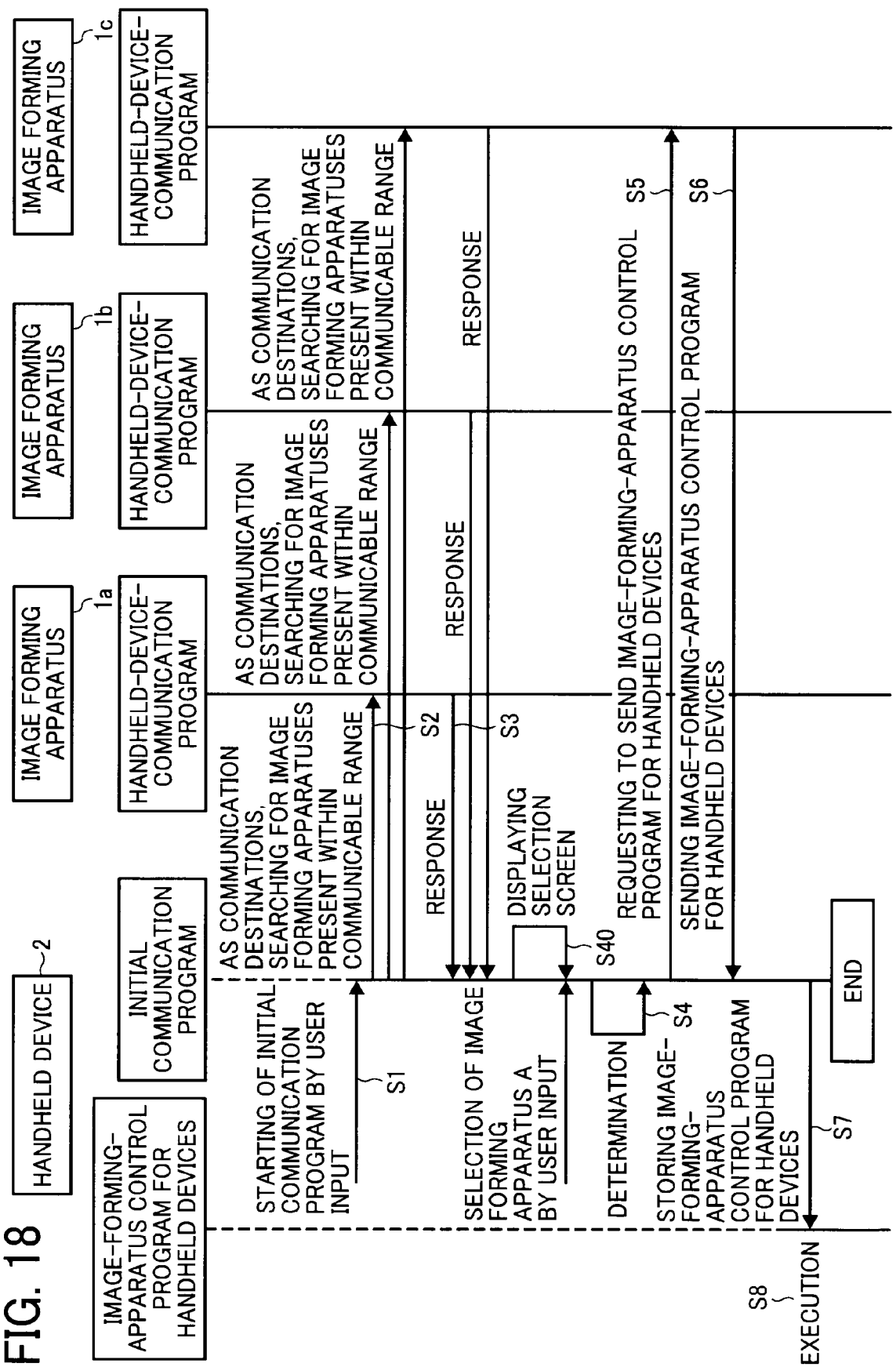
FIG. 18 is a sequence diagram for explaining the sequence of operations when the handheld device executes the image-forming-apparatus control program for handheld devices in the case when the image forming apparatus is present in plurality within the communicable range of the handheld device.

Explained below with reference to FIG. 18 is the sequence of operations when the handheld device 2 executes the image-forming-apparatus control program for handheld devices in the case when the image forming apparatuses 1a, 1b, and 1c are present in the communicable range of the handheld device 2. In an identical manner to that described above, in response to an operation input performed by the user from the operation display unit 20, the CPU 24 of the handheld device 2 starts the initial communication program (Step S1) and searches for image forming apparatuses within the range in which it can perform communication via the wireless communication unit 22 (Step S2). During that search, the CPU 24 sends out inquiries by broadcast via the wireless communication unit 22 (i.e., sends inquiry data to an unspecified number of destinations by means of wireless communication).

Meanwhile, when the power of each of the image forming apparatuses 1a, 1b, and 1c is switched ON; the respective CPUs 15 run the respective handheld-device-communication programs. When the CPU 15 in each of the image forming apparatuses 1a, 1b, and 1c receives the inquiry data from the handheld device 2 via the wireless communication unit 18, it notifies the handheld device 2 that the corresponding image forming apparatus is present within the communicable range of the handheld device 2 (Step S3). Upon receiving those responses, the CPU 24 determines that the image forming apparatuses 1a, 1b, and 1c are present within the communicable range thereof. Subsequently, as illustrated in FIG. 17, the CPU 24 displays on the operation display unit 20 the selection screen 60 illustrating the list of communicable image forming apparatuses 1a, 1b, and 1c, and prompts the user to select a target image forming apparatus for communication (Step S40). Once the target image forming apparatus for communication is selected from the selection screen 60, the CPU 24 determines whether to obtain the image-forming-apparatus control program for handheld devices from the selected image forming apparatus (Step S4). The details regarding the determination are the same as described above with reference to FIG. 15.

Herein, for example, assume that an operation input for selecting the image forming apparatus 1c is performed from the selection screen. In that case, since the determination result at Step S20 comes out to be negative, the CPU 24 decides to obtain the image-forming-apparatus control program for handheld devices from the image forming apparatus 1c (Step S24) and, in an identical manner to that described in the embodiment, sends to the image forming apparatus 1c a request to send the image-forming-apparatus control program for handheld devices (Step S5). In response to that request, the image forming apparatus 1c reads from the corresponding memory device 17 the image-forming-apparatus control program for handheld devices including unique information that enables identification of the image forming apparatus 1c and then sends that program to the handheld device 2 (Step S6). Upon receiving the image-forming-apparatus control program for handheld devices, the CPU 24 of the handheld device 2 stores it in the memory unit 21 (Step S7) and executes it upon loading (Step S8). Consequently, the CPU 24 displays the initial setting screen 66 as illustrated in FIG. 17 on the operation display unit 20. Then, in response to an operation input performed by the user, the CPU 24 changes the setting screens displayed on the operation display unit 20 as illustrated in FIGS. 6 to 8, generates a configuration file, and stores it in the memory unit 21. Using that configuration file, the CPU 24 then displays, for example, the implementation request screen as illustrated in FIG. 11 on the operation display unit 20. If an operation input for requesting image formation is performed from the implementation request screen; then the CPU 24 ends the execution of the image-forming-apparatus control program for handheld devices, restarts the execution of the initial communication program, and issues an image forming request to the image forming apparatus 1*c*.

Assume that an operation input for selecting the image forming apparatus 1*a* is performed from the selection screen. In that case, since the determination result at Step S20 comes out to be positive, the CPU 24 reads the configuration file corresponding to the image forming apparatus 1*a* from the memory unit 21 and displays an implementation request screen on the operation display unit 20 using the read configuration file. That is, the implementation request screen 64 as illustrated in FIG. 17 is displayed on the operation display unit 20. If an operation input of requesting customization is performed from the implementation request screen 64; then the positive determination result obtained at Step S22 illustrated in FIG. 15 prompts the CPU 24 to decide to obtain the image-forming-apparatus control program for handheld devices from the image forming apparatus 1*a* (Step S24). Then, as described above, the CPU 24 receives the image-forming-apparatus control program for handheld devices, stores it in the memory unit 21, and executes it upon loading. Consequently, the CPU 24 displays the initial setting screen as illustrated in FIG. 12 on the operation display unit 20. Then, in response to an operation input performed by the user, the CPU 24 changes the setting screens displayed on the operation display unit 20 as illustrated in FIGS. 6 to 8 and updates the configuration file stored in the memory unit 21. Using that configuration file, the CPU 24 then displays, for example, the implementation request screen as illustrated in FIG. 13 on the operation display unit 20. If an operation input for requesting image formation is performed from the implementation request screen; then the CPU 24 ends the execution of the image-forming-apparatus control program for handheld devices, restarts the execution of the initial communication program, and issues an image forming request to the image forming apparatus 1*a*. Meanwhile, also in the case when an operation input for selecting the image forming apparatus 1*b* is performed from the selection screen, identical operations are performed.

In this way, in the present embodiment, by performing a simple operation input using the familiar handheld device 2, the user is able to set in advance the advanced setting items as the image forming conditions with respect to the image forming apparatus 1. Moreover, the user can send to the image forming apparatus 1 an image forming request that includes the image forming conditions. Thus, without having to perform any complex operation inputs, the implementation request screen can still be customized according to the preferences of the user thereby making it simpler to perform operation inputs with respect to the image forming apparatus 1. That eliminates the difficulty encountered when one has to operate the unfamiliar operation display unit 10 at the time of using the image forming apparatus 1. For example, as illustrated in FIG. 2, a screen with a large number of buttons is displayed on the operation display unit 10 and touching a button on that screen leads to the display of another screen for the purpose of advanced settings. Hence, a lot of times it is difficult to figure out at first glance the necessary operations to perform in order to implement an intended function. However, according to the present embodiment, at the time when the user performs an operation input for the purpose of issuing an image forming request to the image forming apparatus 1, the implementation request screen as illustrated in FIG. 11 or FIG. 13 is displayed on the handheld device 2. That allows the user to figure out at first glance the manner in which an operation input is to be performed for implementing an intended function. Moreover, in the present embodiment, in order to provide simplicity in performing operation inputs with respect to the image forming apparatus 1 from the handheld device 2, the customization settings can be provided on a user-by-user basis without having to perform personal authentication or without having a personal authentication function.

Moreover, even with respect to the image forming apparatuses each having different functions and capability, simple operations can be performed from the handheld device 2 depending on the intended use of each image forming apparatus. When a plurality of image forming apparatus is present in the communicable range of the handheld device 2, a different implementation request screen corresponding to each selected image forming apparatus can be displayed on the operation display unit 20. That makes it possible to flexibly issue an image forming request to a particular image forming apparatus according to the user intentions. For example, if the image forming apparatus 1*a* has superior copying capability but is only capable of monochrome printing and if the image forming apparatus 1*b* has smaller copying capability than the image forming apparatus 1*a* but is capable of color printing, then it is possible to display different implementation request screens on the operation display unit 20 according to the intended use of the image forming apparatuses. That enables the user to perform operation inputs from such implementation request screens and to send to each image forming apparatus the image forming requests that include the image forming conditions corresponding to the predetermined advanced setting items.

MODIFICATION EXAMPLE

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents. For example, some of the constituent elements illustrated in the present embodiment can be deleted or different constituent elements in the present embodiment can be appropriately combined. Moreover, it is also possible to apply following modifications.

In the present embodiment, each computer program executed in the image forming apparatus 1 can be saved on a computer connected to a network such as the Internet and can be downloaded therefrom via the network. Alternatively, each computer program according to the present embodiment can be provided in the form of an installable file or an executable file on a computer-readable storage device such as a compact disk read only memory (CD-ROM), a flexible disk (FD), a compact disk recordable (CD-R), or a digital versatile disk (DVD).

Besides, although the image forming apparatus 1 according to the present embodiment is configured to be able to perform the copying function, the printing function, the scanning function, and the facsimileing function; it is also possible to configure the image forming apparatus 1 to perform at least two or more of those functions or to function only as a copying machine, a printer, a scanning apparatus, or a facsimileing apparatus.

Moreover, in the present embodiment, at the time when the image forming apparatuses 1a, b, and 1c receive from the handheld device a request to send the image-forming-apparatus control program for handheld devices, the image forming apparatuses can be configured to make use of the SCS 122 and verify whether the user is a legitimate user to whom the image-forming-apparatus control program for handheld devices can be sent. Alternatively, the image forming apparatuses can be configured to perform personal authentication and determine whether the user is authenticated to use the image forming apparatuses.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An image formation supporting system comprising:
   an image forming apparatus having at least one of an image reading function, a copying function, a printing function, and a facsimile communication function and being capable of implementing a function related to image formation; and
   a handheld device performing communication with the image forming apparatus, wherein
   the image forming apparatus includes
      a first memory unit for storing a program that is executed in a handheld device
         for the purpose of displaying on the handheld device a first screen for setting an advanced setting item as an image forming condition at the time of performing image formation by implementing the function and
         for the purpose of displaying on the handheld device a second screen for requesting image formation;
      a sending unit for sending to the handheld device the program stored in the first memory unit in response to a request from the handheld device; and
      an image forming unit for performing, when the handheld device sends an image forming request that has an image forming condition specified therein and that requests for image formation by implementation of the function, image formation according to the image forming condition specified in the image forming request,
   the handheld device includes
      an input receiving unit for receiving an operation input from a user;
      a program requesting unit for requesting in response to the operation input received by the input receiving unit and according to a predetermined determination condition, the image forming apparatus for the program;
      a receiving unit for receiving the program from the image forming apparatus;
      a second memory unit for storing the program received by the receiving unit; and
      an executing unit for executing the program, the executing unit including
         a first display control unit for displaying the first screen on a display unit by executing the program;
         a memory control unit for setting, in response to an operation input received with respect to the first screen by the input receiving unit, the advanced setting item and storing a configuration file that indicates setting of the advanced setting item in the second memory unit in a corresponding manner with the image forming apparatus;
         a second display control unit for displaying the second screen on the display unit by making use of the configuration file; and
         a request sending unit for sending, according to an operation input received with respect to the second screen by the input receiving unit, an image forming request, in which is specified the setting of the advanced setting item indicated in the configuration file, as an image forming condition to the image forming apparatus,
      wherein the program requesting unit includes
         a determining unit for determining, in response to an operation input received by the input receiving unit, whether the configuration file is stored in the second memory unit; and
         a requesting unit for requesting, when a determination result of the determining unit is negative, the program which is required from the image forming apparatus, and
      wherein, when the determination result of the determining unit is positive and when the input receiving unit receives an operation input for the purpose of requesting customization with respect to the second screen displayed on the display unit by the second display control unit after the executing unit has executed the program, the requesting unit requests the image forming apparatus for the program.

2. The image formation supporting system according to claim 1, wherein,
   the handheld device further includes a third display control unit for displaying, when the image forming apparatus is present in plurality in a communicable manner with the handheld device, a third screen for prompting selection of a first image forming apparatus as a target apparatus for communication, and
   when an operation input for selecting the first image forming apparatus is received from the third screen, the program requesting unit requests the first image forming apparatus for the program according to the predetermined determination condition.

3. An image formation supporting method implemented in an image formation supporting system that includes
   an image forming apparatus having at least one of an image reading function, a copying function, a printing function, and a facsimile communication function and being capable of implementing a function related to image formation, the image forming apparatus including
      a first memory unit for storing a program that is executed in a handheld device for the purpose of displaying on the handheld device a first screen for setting an advanced setting item as an image forming condition at the time of performing image formation by implementing the function and for the purpose of displaying on the handheld device a second screen for requesting image formation;
      a sending unit; and
      an image forming unit; and
   a handheld device performing communication with the image forming apparatus, the handheld device including
      an input receiving unit;

a program requesting unit;
a receiving unit;
a memory control unit; and
an executing unit,
the image formation supporting method comprising:
sending, by the sending unit, to the handheld device the program stored in the first memory unit in response to a request from the handheld device;
image-forming, by the image forming unit, that includes performing, when the handheld device sends an image forming request that has an image forming condition specified therein and that requests for image formation by implementation of the function, image formation according to the image forming condition specified in the image forming request;
input-receiving, by the input receiving unit, that includes receiving an operation input from a user;
requesting, by the program requesting unit, the image forming apparatus for the program in response to the operation input received by the input receiving unit and according to a predetermined determination condition;
receiving, by the receiving unit, the program from the image forming apparatus;
first-memory-controlling, by the memory control unit, that includes storing the program received at the receiving in a second memory unit; and
executing, by the executing unit, the program, the executing including
first-display-controlling that includes displaying the first screen on a display unit by executing the program;
second-memory-controlling that includes setting, in response to an operation input received with respect to the first screen by the input receiving unit, the advanced setting item and storing a configuration file that indicates setting of the advanced setting item in the second memory unit in a corresponding manner with the image forming apparatus;
second-display-controlling that includes displaying the second screen on the display unit by making use of the configuration file; and
request-sending that includes sending, according to an operation input received with respect to the second screen by the input receiving unit, an image forming request, in which is specified the setting of the advanced setting item indicated in the configuration file, as an image forming condition to the image forming apparatus,
wherein the requesting by the program requesting unit includes
determining, in response to an operation input received by the input receiving unit, whether the configuration file is stored in the second memory unit; and
requesting, when a determination result of whether the configuration file is stored in the second memory unit is negative, the program which is required from the image forming apparatus, and
wherein, when the determination result of whether the configuration file is stored in the second memory unit is positive and when the receiving receives an operation input for the purpose of requesting customization with respect to the second screen displayed on the display unit by the second display control unit after the executing unit has executed the program, the requesting requests the image forming apparatus for the program.

* * * * *